US005723818A

United States Patent [19]

Yeh

[11] Patent Number: 5,723,818

[45] Date of Patent: Mar. 3, 1998

[54] STRUCTURE OF A SAFETY PLUG FOR COAXIAL CABLE

[76] Inventor: Ming-Hwa Yeh, No. 2, Lane 8, Hsin An Rd., Shih Lin District, Taipei, Taiwan

[21] Appl. No.: 110,894

[22] Filed: Aug. 24, 1993

[51] Int. Cl.[6] .......... H02G 15/02

[52] U.S. Cl. .......... 174/74 R; 439/133; 439/304; 439/307

[58] Field of Search .......... 174/74 R, 74 A; 439/133, 304, 307, 620

[56] References Cited

U.S. PATENT DOCUMENTS

| | | | |
|---|---|---|---|
| 2,552,313 | 5/1951 | Friedberg et al. | 174/74 R |
| 3,861,770 | 1/1975 | Horak | 439/307 |
| 3,890,028 | 6/1975 | Blanchenot | 439/133 |
| 3,953,097 | 4/1976 | Graham | 439/307 |
| 5,011,422 | 4/1991 | Yeh | 439/307 |
| 5,106,312 | 4/1992 | Yeh | 439/133 |
| 5,273,444 | 12/1993 | Down et al. | 439/133 |

*Primary Examiner*—Morris H. Nimmo
*Attorney, Agent, or Firm*—Pro-Techtor International

[57] ABSTRACT

An improved structure of a safety plug for coaxial cable comprising a main body and a hand tool, said main body is a hollow circular tube having an internal flange at its rearward wall, in an appropriate location at the forward end of the circular tube is an annular groove and an annular sloping portion in between the annular groove and the sloping portion, which are both inside the circular tube, are spring washer, a coaxial cable and a clamping element. When the main body of the safety plug is rotated, the cable will not be able to rotate with the main body, a special hand tool has to be used to drive the safety plug with the coaxial cable into and out of the input jack.

1 Claim, 6 Drawing Sheets

STRUCTURE OF A SAFETY PLUG FOR COAXIAL CABLE

BACKGROUND OF THE INVENTION (a) Field of the Invention

The present invention relates to a safety plug, particularly to an improved structure of a safety plug for coaxial cable. Such safety plug is mainly used in cable television systems (CATV), subscription television (STV) and master antenna TV system (MATV).

(b) Description of the Prior Art

In a conventional cable television system, a coaxial cable male connector (generally it is called an 'F' connector in the coaxial connector group) is connected to the input of the television set so that signals can be transmitted into the television set. Certain application requires the coaxial cable not be removed by unauthorized personnel, such as in a public place or paid cable television. Some of the customers tend to connect the cable plug into their own television set so that they do not have to pay for the cable television. This is a drawback.

To correct the above drawback, safety connectors for coaxial cable are available in the market nowadays. A conventional coaxial connector is shown in FIG. 1. It uses a protruded portion 1 of a hand tool 2 to fit into a slot 3 of the connector body 4 for rotation so as to connect or disconnect the coaxial cable. Such configuration has the following drawbacks:

1. It is easy to slide out.
2. The original coaxial cable with the connector has to be cut away and replaced with the specially designed connector. The assembling of the replaced coaxial connector is a waste of time and money.

SUMMARY OF THE INVENTION

The main object according to the present invention is to provide a device in which a hand tool and a connector inside the safety plug of a coaxial connector can be fitted together tightly.

Another object according to the present invention is to provide a main body to the existing coaxial 'F' connector so that the existing 'F' connector does not have to be replaced. This effectively lowers the cost and the time in replacing the coaxial connector.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
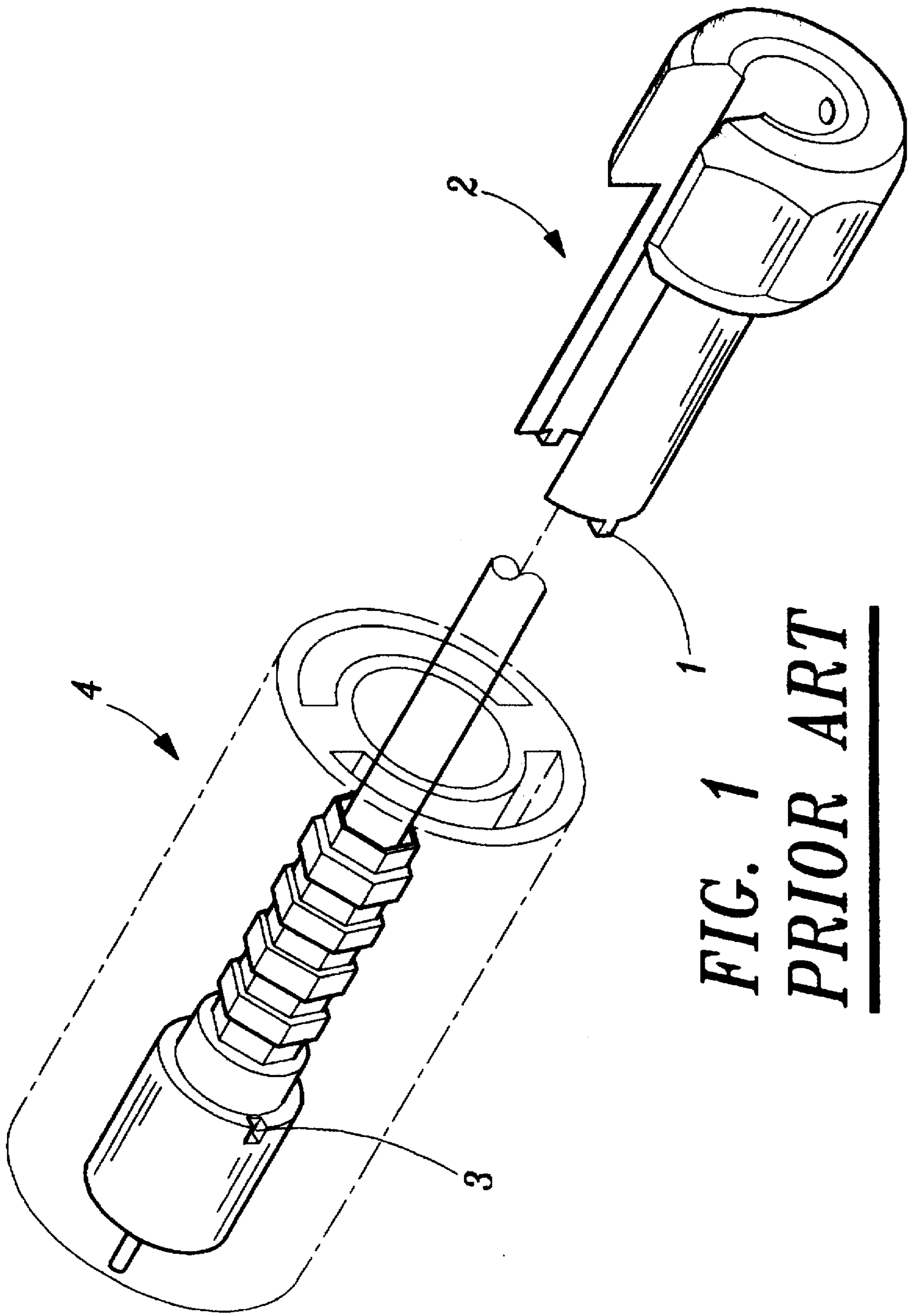
FIG. 1 PRIOR ART
FIG. 1 is a diagrammatic view of a coaxial cable connector from the prior art.
Figure 2:
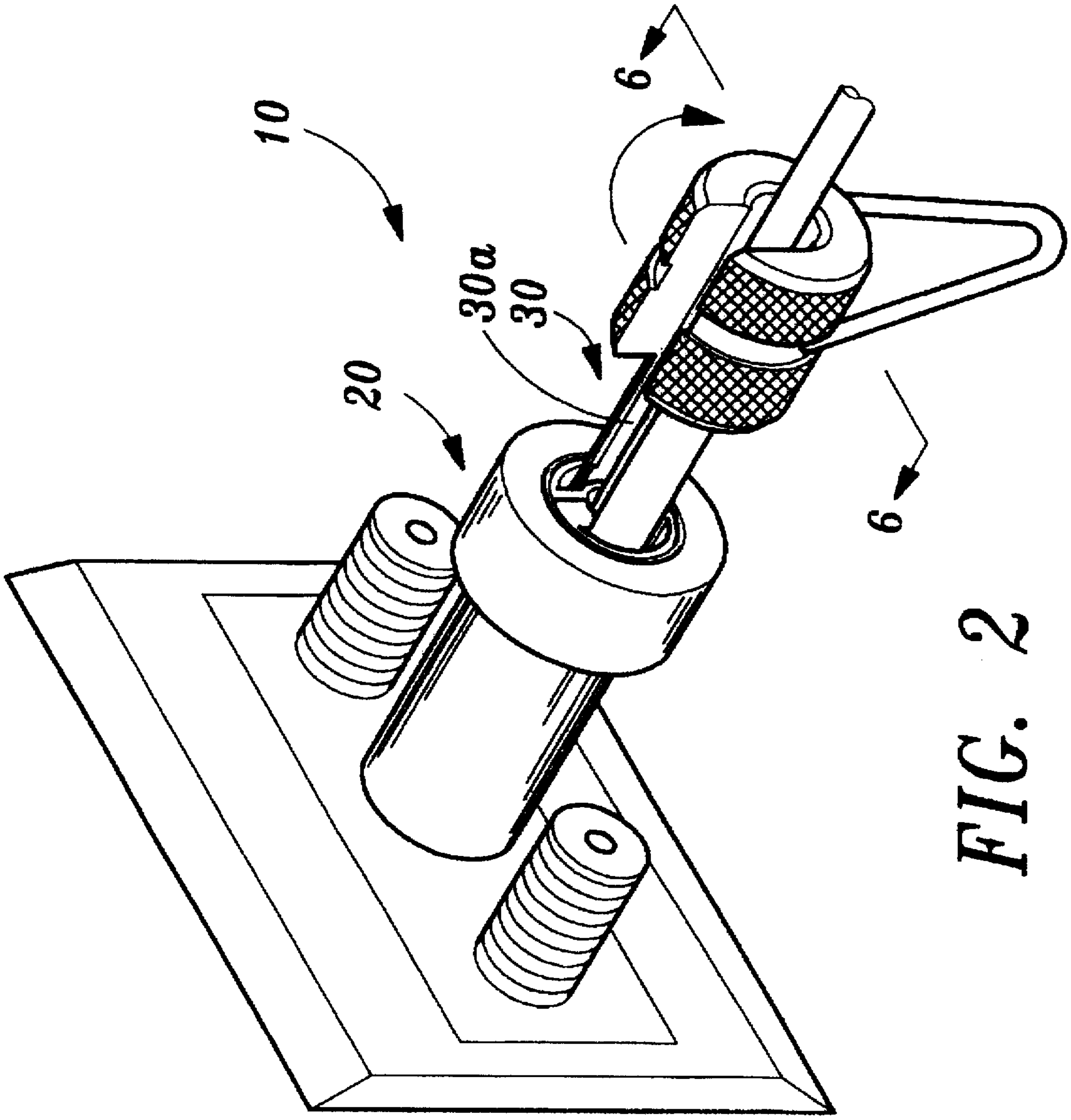
FIG. 2 is a perspective view of the improved structure of the coaxial cable safety connector according to the present invention.
Figures 3, 3A:
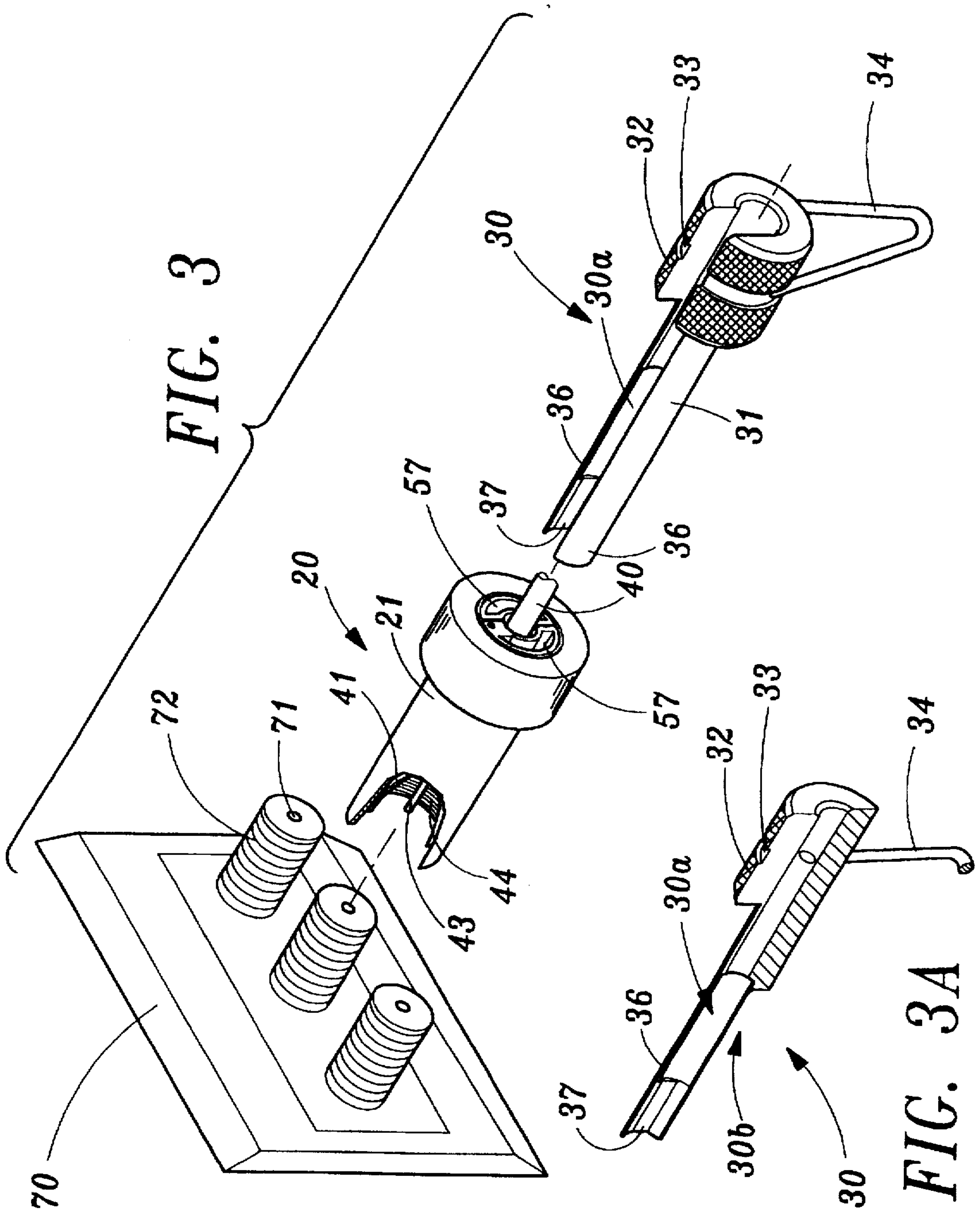
FIG. 3 is a partially cut-away view of the hand tool according to the present invention.
FIG. 3*a* is a cross sectional view of the hand tool according to the present invention.
Figures 4, 4A:
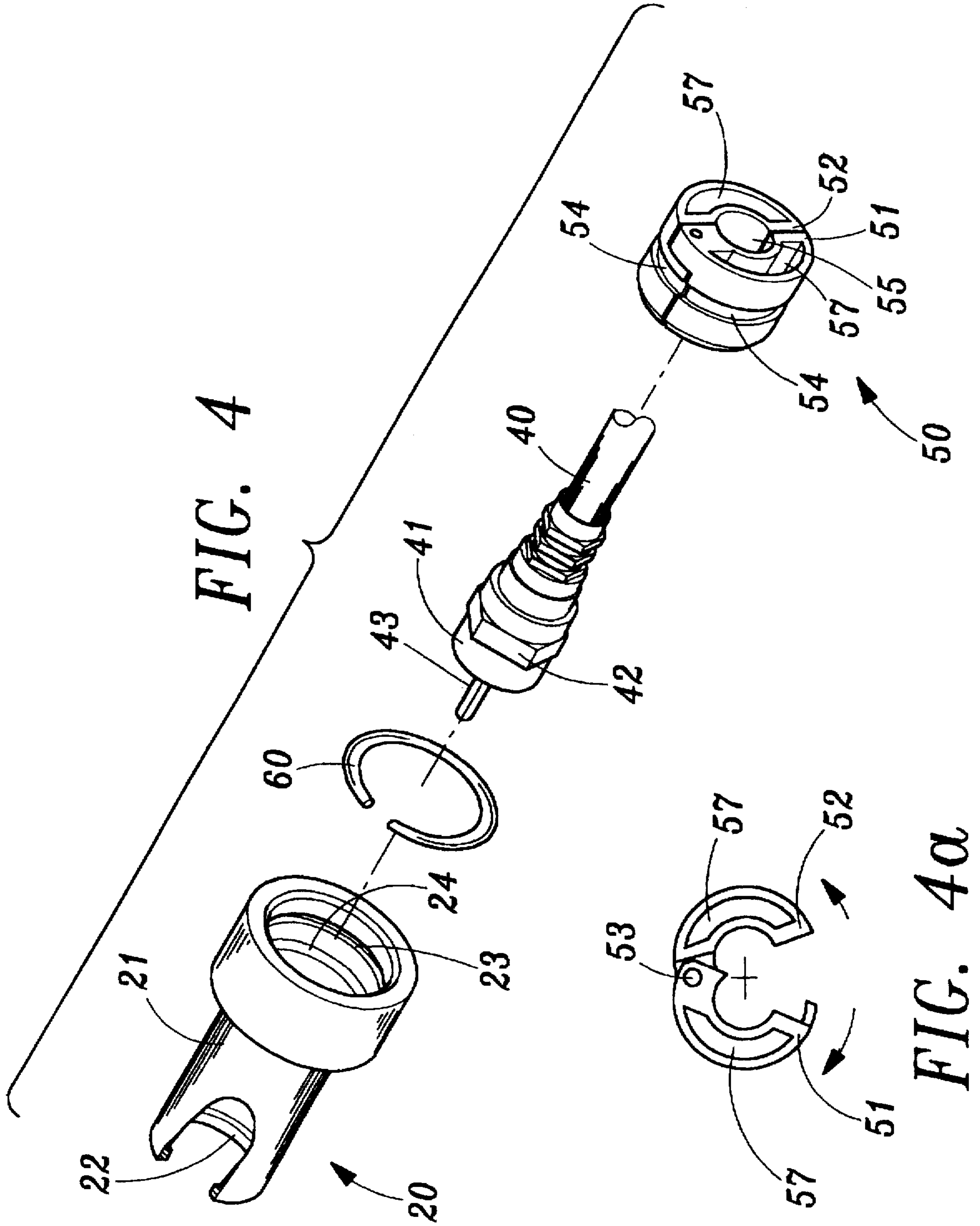
FIG. 4 is a perspective fragmented view of the main body according to the present invention.
FIG. 4*a*shows the opening condition of the clamping element of the safety plug according to the present invention.

Referring to FIGS. 2, 3 and 4, the coaxial cable safety plug 10 according to the present invention mainly consists of a main body 20, a clamping element 50 and a hand tool 30. Said main body 20 is a hollow circular tube 21 having an internal flange 22 at its rearward wall. In an appropriate location at the forward end of the circular tube 21 is an annular groove 23 and an annular sloping portion 24. In between the annular groove 23 and the sloping portion 24, which are both inside the circular tube 21, are spring washer 60, a coaxial cable 40 and a clamping element 50, all of the three components are aligned concentrically. Additionally, the spring washer 60 is placed inside the annular groove 23, the coaxial cable is generally of conventional structure, having a connector 41 at one end. Said connector 41 is of hexagonal shape 42 with internal screw threads 44 at its forward end, for screwing into the screw threads 72 of the input jack 7. The clamping element 50 is made up of a left member 51 and a right member 52 both of which are riveted together pivotally by an axle pin 53. The left member 51 and the right member 52 can be expanded outward simultaneously, as is shown in FIG. **4*a*. When the left member 51 and the right member 52 are pressed together they form a circular body having a groove 54 in its exterior surface. In the clockwise and counter clockwise direction are two annular slots 57. Additionally, the edge of the interior wall is of semi-arc shape so that when the two members are put together the inside edge forms a circular channel 55**.

When the left member 51 and the right member 52 of the clamping element 50 is opened and the circular channel 55 is placed on the coaxial cable 40, a push in the axial direction enclosed the clamping element 50 into the circular tube 21 such that the groove 54 of the clamping element 50 can be fitted and secured together with the spring washer 60.

The hand tool 30, has a hollow tube 31 with a handle 32 at its rearward end. The exterior surface of the handle 32 has a groove 33 from which a ring 34 is attached to so that a user may put his finger into the ring after use. This prevents the hand tool 30 from getting lost. At the top and bottom of the forward portion of the hollow tube 31 are two grooves **30*a* and 30*b* in the longitudinal direction such that the rest of the tube wall forms two semi-arc tube 36. An internal hexagonal shape 37 is formed at the forward inner wall of the two semi-arc tubes 36**.

Figure 5:
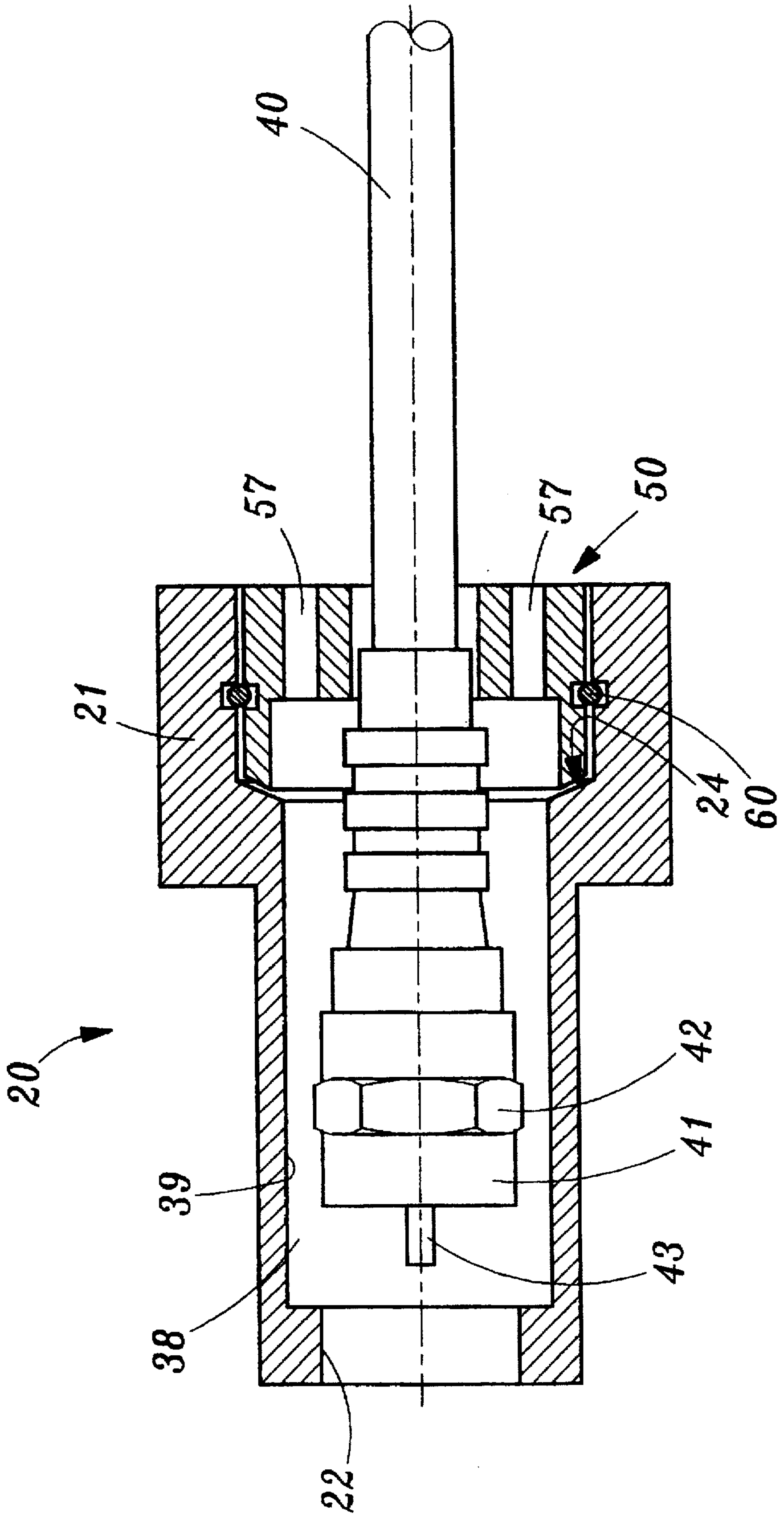
FIG. 5 is a cross-sectional view of the main body of the safety plug according to the present invention.
Figure 6:
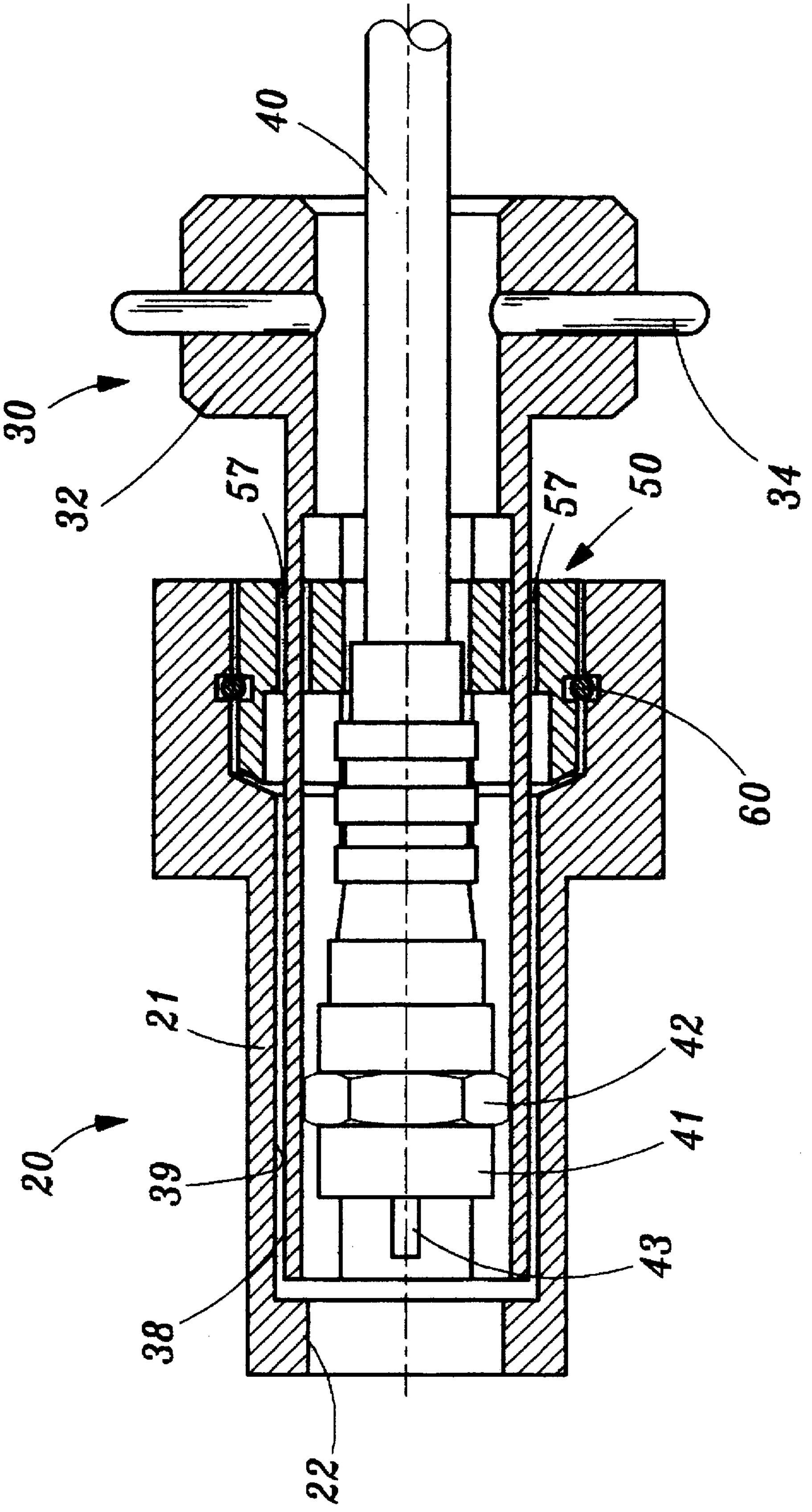
FIG. 6 is a cross-sectional view looking from the top of the main body of FIG. 4 according to the present invention.

Referring to FIGS. 5 and 6, the hand tool 30 is configured to be used by inserting it into the annular slots 57 such that the internal hexagonal shape 37 is fitting with the hexagonal shape 42 of the connector 41. Since the exterior surface 38 at the forward end of the hand tool 30 is matched with the internal wall 39 of the circular tube 21, rotating the hand tool 30 also drives the clamping element 50, and the connector 41 of the coaxial cable 40 is rotated to screw into the input jack 70. Since the top and bottom of the forward portion of the hollow tube 31 have two grooves **30*a* and 30*b*, when the hand tool 30 is rotated to lock tightly, the internal and the external surface of the hand tool 30 are designed to mate with the hexagonal shape 42 of the connector 41 and the internal wall of the circular tube 21, therefore, the two grooves 30*a* and 30*b* in the longitudinal direction do not have enough space to expand and slide out, allowing the conducting wire 43 of the coaxial cable 40 to be inserted into the signal input socket 71 of the input jack 70 so that the signal can be input, as shown in FIG. 2**.

While there have been shown and described what are considered at present to be the preferred embodiments of the present invention, it will be appreciated by those skilled in the art that modifications of such embodiments may be made. It is therefore desired that the invention not be limited to these embodiments, and it is intended to cover in the appended claims all such modifications as fall within the true spirit and scope of the invention.

What is claimed is:

1. A safety plug for a coaxial cable comprising:

a clamping element comprising a left member and a right member riveted together pivotally by an axle pin so that the left member and the right member can be expanded outward simultaneously, the left member and the right member form a circular body when they are pressed together, the circular body having a groove in an exterior surface, the left member and the right member each having an annular slot therein, and the interior wall of each member is a semi-arc so that when the two members are pressed together their interior walls define a circular channel;

a main body in the shape of a hollow circular tube, the main body having an internal flange at a rearward end and an annular groove near a forward end, with a sloping portion between the rearward and forward ends, a spring washer fits into said annular groove and is also contained in an annular groove on said clamping element such that the clamping element is secured in said main body, said clamping element securing a coaxial cable therein and including a connector that is hexagonal in shape with an interior threaded area at a forward end, said threaded area receiving threads of an input jack;

a hand tool comprising two opposing semi-arc elements with a handle at a rearward end, the exterior of the handle including a groove with a ring attached therein, said semi-arc elements being insertable into said annular slots in said clamping element such that when a rotational force is applied to the hand tool, the connecting member and hence the safety plug is screwed onto said input jack.

* * * * *